United States Patent [19]

Welch

[11] 4,269,327
[45] May 26, 1981

[54] DEVICE FOR CARRYING OUT HIGH PRECISION DILUTIONS AND DOSAGES OF LIQUIDS, PARTICULARLY BIOLOGICAL LIQUIDS

[76] Inventor: Henry H. Welch, No. 437, Via Nomentana, 00162 Rome, Italy

[21] Appl. No.: 908,991

[22] Filed: May 24, 1978

[51] Int. Cl.³ .......................................... G01F 11/06
[52] U.S. Cl. .................................... 222/135; 222/309
[58] Field of Search ......................... 222/137, 309, 135

[56] References Cited

U.S. PATENT DOCUMENTS

| | | | |
|---|---|---|---|
| 3,554,411 | 1/1971 | Leining | 222/309 X |
| 3,810,720 | 5/1974 | Lartigue et al. | 222/137 X |
| 3,837,534 | 9/1974 | Natelson | 222/137 |
| 3,863,805 | 2/1975 | Dzaack et al. | 222/309 X |
| 4,120,202 | 10/1978 | Ranle et al. | 222/309 X |

*Primary Examiner*—Charles A. Marmor
*Attorney, Agent, or Firm*—Trexler, Wolters, Bushnell & Fosse, Ltd.

[57] ABSTRACT

A device is provided comprising in combination a support frame, a block or interchangeable element mounted on the frame, a pair of pistons carried by the block and reciprocated by a motor mounted on the frame, a set of ducts and valves connecting the pistons with a drawing reservoir, a delivery duct, and threaded stems to change the stroke of each of the pistons and consequently the amount of the drawn and delivered liquid.

4 Claims, 6 Drawing Figures

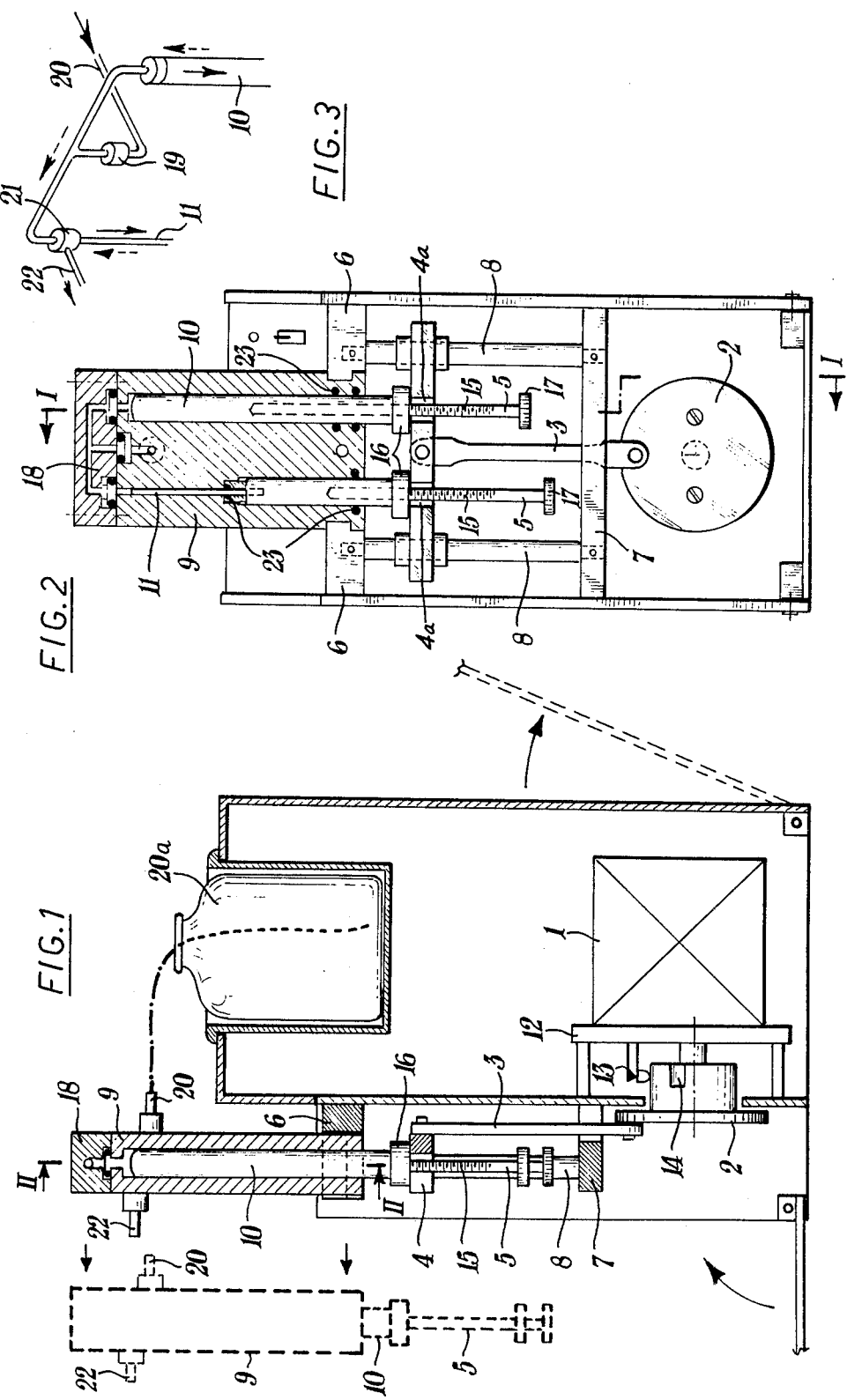

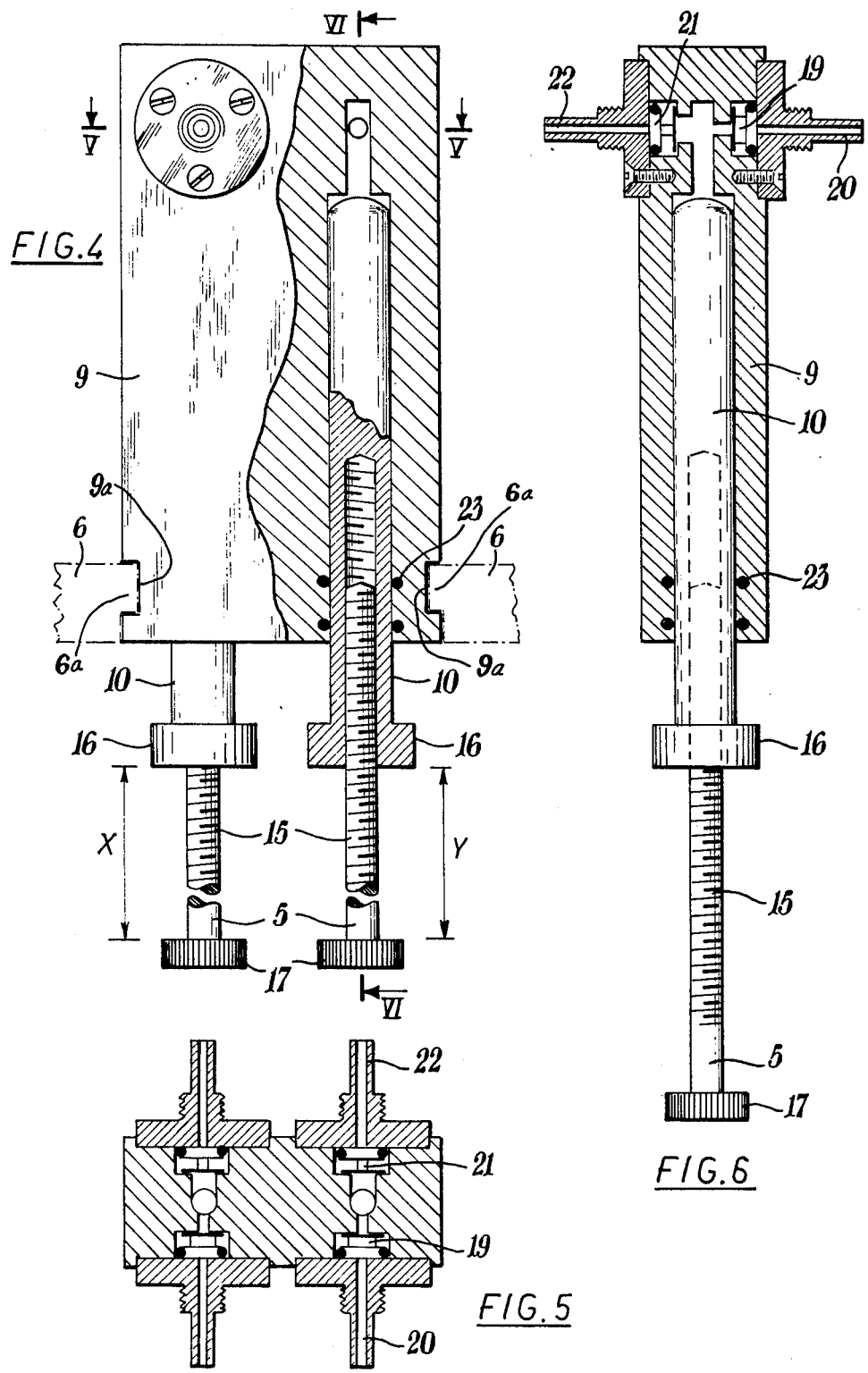

DEVICE FOR CARRYING OUT HIGH PRECISION DILUTIONS AND DOSAGES OF LIQUIDS, PARTICULARLY BIOLOGICAL LIQUIDS

The present invention relates to an apparatus allowing various micro-dilutions to be carried out on biological liquids, with a high precision and with no contamination. The invention relates to a diluting and dosing device with elements variable and interchangeable at will, gauged at whatever desired volume. For each type of dilution or addition of reagent, an already gauged element will be supplied.

The need exists, particularly in the field of analyses on biological liquids, of carrying out several different dilutions with the use of different reagents and with different volumes. Up to day two types of automatic diluting or dosing devices exist:

(A) Fixed volume diluting devices. For each type of analysis or dilution, a fixed volume diluting device is gauged, which can carry out only the dilutions with these gauged volumes, and with no other. Furthermore, said diluting or dosing device must be used exclusively for the dilutions with a single reagent. It is not possible to change easily the type of reagent, as not all types of reagents are compatible and a contamination can occur, or the mixture of the two reagents can precipitate, damaging the syringe system. In each case a contamination of the dilutions occurs passing from one type of reagent to another. In order to remove said drawback it would be necessary to wash well initially the unit through a long period of time, and then introduce the new reagent.

(B) Variable diluting devices. These devices have the possibility of changing the dilution volumes, and practically they could be able to carry out whatever dilution. The drawback remains of the contamination when a type of analysis follows the preceding one, as there remains the old reagent, both in the syringes and in the pipes, and this reagent must be well washed out first with water and then with the new reagent. This implies a loss of time, and never the assurance is reached that the washing operation has been perfect so that the new reagent will not contaminate the analyses.

In case of fixed volume diluting or dosing device as many different diluting devices must be provided, as the analyses to be carried out are, and this can be very expensive considering that in a laboratory 10 to 30 different dilutions can be necessary. In the case (B), of variable volume diluting or dosing devices, also several diluting devices must be provided, in order to avoid the great loss of time necessary for washing and preparing the diluting device for a new analysis.

The purpose of this invention is that of embodying a new diluting device capable of carrying out all dilutions and dosages of reagent, utilizing interchangeable elements already gauged for each type of dilution as possibly necessary, so that the sole need will be that of changing the element. Each element is already gauged for a given analysis or for a given dilution. Said element is used only with one reagent eliminating the contamination.

The main advantages are as follows:

(I) A single diluting device solves the problems of all dilutions required in a laboratory.

(II) For each type of analysis an element is pre-disposed and gauged, carrying the name of the analysis to be carried out, removing thereby the errors or the contaminations.

(III) There is no need of remembering the various gaugings or volumes, for each type of analysis, as the element is already gauged.

(IV) There is no need of gauging again and washing each time when a new analysis is carried out.

(V) The interchangeable elements can also be located in a refrigerator in order to preserve the reagent if it is not stable at the room temperature.

(VI) Each element can be gauged again at any wanted time.

(VII) The elements can operate as diluting devices and also as double dosing devices in an apparatus.

(VIII) Quick carrying out of more than 900 dilutions each hours.

According to this invention, a device is provided comprising in combination, a support frame, a block or interchangeable element mounted on said frame, a pair of pistons carried by said block and reciprocated by a motor mounted on said frame, a set of ducts and valves connecting said pistons with a drawing reservoir, and a delivery duct, and means to change at will the stroke of each of said pistons and consquently the amount of the drawn and delivered liquid.

This invention will be now described with reference to the attached drawings showing by way of non limitative example one preferred embodiment of this invention.

In the drawings:

FIG. 1 shows the unit of the diluting device, in a sectional view taken along the line I—I of FIG. 2;

FIG. 2 is a front view, with the interchangeable block in sectional view, taken along the line II—II of FIG. 1;

FIG. 3 diagrammatically shows the flow of the liquid;

FIG. 4 shows a variant of the interchangeable block, partially sectioned;

FIG. 5 is a sectional view taken along the line V—V of FIG. 4;

FIG. 6 shows a sectional view taken along the line VI—VI of FIG. 4.

With reference to FIGS. 1 and 2, the diluting-dosing unit comprises a motor 1 which rotates a disc 2 whereon is pivoted in eccentric position, the connecting rod 3 moving a support bar 4 which is passed through by the stems 5 of the pistons 10 and 11.

Rigid with the unit frame are provided two upper supports 6 and a lower rail 7 to which are fixed to parallel uprights 8 along which is slidingly guided the support bar 4. Between the supports 6 is mounted, by insertion in a predetermined given direction, an interchangeable block or element 9 having groove means 9a cooperatively interengageable with track means 6a on the supports 6 as is shown in FIG. 4. The block 9 is provided with the chambers for the pistons 10 and 11. As the stems 5 of said pistons are simply passing through the associated recesses 4a carried by the support 4, the whole block 9 with its associated pistons and stems can be easily removed and inserted as shown in dotted line in FIG. 1.

Near the motor 1 is mounted a base 12 carrying a micro-switch 13 which co-operating with the notch 14 provided in the cam 2 can stop the motor when the cam is in correspondence with the upper or lower dead point.

The two cylindrical chambers provided in the block 9 can either have equal sections as for instance denoted by 10 or, as shown in FIG. 2, there can be a piston 10 having a greater section in order to intake a macro-amount of liquid, and a needle piston 11 in order to intake a micro-amount of liquid.

The two pistons have abutment members 16 in the shape of sleeves while each of the two stems 5 is provided with a knob 17 and is screwed to the associated piston by means of the threads 15.

The operation is as follows: the rotation of the cam disc 2 is transformed into a reciprocation of the bar 4 along the uprights 8. When the bar 4, in its downwards stroke contacts the knobs 17 there is a drawing stroke of the pistons 10 and 11 which through the valve unit 18 will draw the liquid from the duct 20 leading to a reservoir 20a. During the upwards stroke of the rod 4, the action occurs on the abutments 16 and thus the compression stroke of the pistons 10 and 11. It is to be noted that the stroke of the pistons, and thus the amount of drawn liquid, can be changed by modifying the distances X and Y of FIG. 4. This can be made in an extremely quick and precise manner by screwing or unscrewing the stems 5 by means of the knurled knobs 17 and the threads 15.

The FIG. 3 diagrammatically shows the flow of the liquid. During the downwards stroke of the piston 10 the valve 19 will open allowing the liquid of the duct 20 coming from the reservoir 20a to enter into the cylinder of the piston 10 and simultaneously the valve 21 will be shut off. As soon as the piston 10 starts to move upwards again, the valve 19 (see also FIGS. 5 and 6) will be shut off, and the valve 21 will open and liquid contained within the cylinder will be delivered through the duct 22. For a perfect seal of the pistons within the respective cylinders, the o-ring packings 23 are provided.

As aforesaid, the block 9 with the pistons the stems the distribution head 18 are easily interchangeable. If the type of liquid to be diluted or dosed is to be changed, it will be sufficient to remove the reservoir 20a from its seat, to locate the new reservoir and to mount the new block 9 associated to the new reservoir, after removal of the preceding one. Thus any need of washing, and any danger of contamination will be eliminated.

The present invention has been described in one preferred embodiment thereof, but it will be understood that constructive changes might be practically entered without thereby departing from the scope of the present industrial privilege.

Having thus described the present invention, what is claimed is:

1. An apparatus for delivering precise dosages of biological liquids comprising an interchangeable block member, a support frame member releasably supporting said block member and interengaging track means and groove means on said members for slidably interconnecting said members along a given direction, said support frame member including: upper support means comprising one of said track means and groove means; two parallel uprights depending from said upper support means; a reciprocable cross bar guidably engaging said parallel uprights and movable in a direction generally perpendicular to said given direction, said cross bar having at least one laterally outwardly opening recess; and means for moving said cross bar toward and away from said block member, said interchangeable block member including: at least one chamber; a piston slidably diposed in said chamber and having a threaded bore therein; a threaded stem depending from the piston, said stem rotatably engaged in said bore and disposed to be received in the recess in said cross bar when the block member is connected with said support frame member; abutment means on said stem disposed to contact the cross bar during a portion of said movement away from the block member; an abutment member on said piston disposed to contact the cross bar during a portion of said movement toward the block member; and a set of ducts and valves in said block member for interconnecting a drawing reservoir and a delivery duct with said chamber, whereby, upon reciprocation of said cross bar, said piston is partially withdrawn from the chamber by said contact of the cross bar with said abutment means on the stem and said piston is partially driven into said chamber by said contact of the cross bar with said abutment member so that said liquid is displaced from the reservoir to the delivery duct, and whereby the quantity of liquid displaced is determined by the rotatably adjustable length of the stem between the abutment means and said abutment member.

2. An apparatus for delivering precise dosages of biological liquids according to claim 1, wherein said support frame member further includes a plurality of recesses in said cross bar and said block member further includes a plurality of chambers; a piston slidably disposed in each of said chambers and having a threaded bore therein, a threaded stem depending from each of the pistons, each of said stems rotatably engaged in said bore and disposed to be received in one of the recesses in said cross bar; abutment means on each of said stems; an abutment member on each of said pistons and a set of ducts and valves in said block member for interconnecting a drawing reservoir and a delivery duct with each of said chambers.

3. An apparatus for delivering precise dosages of biological liquids according to claim 1 or 2 wherein said means for moving said cross bar includes a motor, a disc mounted on said motor, and a connecting rod having two ends, said connecting rod pivotally attached to the cross bar at one of said ends and pivotally attached at an eccentric position to the disc at the other of said ends.

4. An apparatus for delivering precise dosages of biological liquids according to claim 3 wherein said block member further includes two chambers of different sizes such that the first of said chambers displaces a micro-amount of liquid and the second of said chambers dispenses a macro-amount of liquid.

* * * * *